United States Patent
Nyström et al.

(10) Patent No.: US 10,962,374 B2
(45) Date of Patent: Mar. 30, 2021

(54) METHOD AND CONTROL UNIT IN A VEHICLE FOR ESTIMATING A STRETCH OF A ROAD BASED ON A SET OF TRACKS OF ANOTHER VEHICLE

(71) Applicant: Scania CV AB, Södertälje (SE)

(72) Inventors: Tom Nyström, Södertälje (SE); Samuel Malinen, Stockholm (SE)

(73) Assignee: Scania CV AB, Södertälje (SE)

( * ) Notice: Subject to any disclaimer, the term of this patent is extended or adjusted under 35 U.S.C. 154(b) by 164 days.

(21) Appl. No.: 16/093,110

(22) PCT Filed: Apr. 13, 2017

(86) PCT No.: PCT/SE2017/050379
§ 371 (c)(1),
(2) Date: Oct. 11, 2018

(87) PCT Pub. No.: WO2017/184061
PCT Pub. Date: Oct. 26, 2017

(65) Prior Publication Data
US 2019/0154451 A1 May 23, 2019

(30) Foreign Application Priority Data
Apr. 19, 2016 (SE) .................... 1650521-6

(51) Int. Cl.
*G01C 21/00* (2006.01)
*G01C 21/28* (2006.01)
(Continued)

(52) U.S. Cl.
CPC ............. *G01C 21/28* (2013.01); *B60W 30/12* (2013.01); *G05D 1/0246* (2013.01);
(Continued)

(58) Field of Classification Search
CPC ........ G01C 21/28; G06F 16/29; B60W 30/12; G05D 1/0246
See application file for complete search history.

(56) References Cited

U.S. PATENT DOCUMENTS

| | | | |
|---|---|---|---|
| 8,428,821 B2 | 4/2013 | Nilsson | |
| 9,663,104 B2 | 5/2017 | Hauler et al. | |

(Continued)

FOREIGN PATENT DOCUMENTS

| | | | |
|---|---|---|---|
| CN | 101778753 A | 7/2010 | |
| CN | 102649408 A | 8/2012 | |

(Continued)

OTHER PUBLICATIONS

Scania CV AB, International Application No. PCT/SE2017/050379, International Preliminary Report on Patentability, dated Oct. 23, 2018.

(Continued)

*Primary Examiner* — Adam M Alharbi
(74) *Attorney, Agent, or Firm* — Moore & Van Allen PLLC; W. Kevin Ransom

(57) ABSTRACT

A method and control unit in a vehicle for estimating a stretch of a road based on a set of tracks of another vehicle, when driving the vehicle along the road in a driving direction to a destination. The method comprises: detecting a set of tracks of the other vehicle, on the road; estimating the geographical position of the detected set of tracks; comparing the estimated geographical position of the detected set of tracks with map data; rejecting the detected set of tracks when it exits the road or when situated in a driving lane in a direction opposite to the driving direction; and otherwise estimating the stretch of the road based on the set of tracks.

11 Claims, 7 Drawing Sheets

(51) Int. Cl.
- *G06K 9/00* (2006.01)
- *G08G 1/16* (2006.01)
- *B60W 30/12* (2020.01)
- *G05D 1/02* (2020.01)
- *G06F 16/29* (2019.01)
- *G08G 1/01* (2006.01)

(52) U.S. Cl.
CPC ......... *G05D 1/0274* (2013.01); *G05D 1/0278* (2013.01); *G06F 16/29* (2019.01); *G06K 9/00798* (2013.01); *G08G 1/0112* (2013.01); *G08G 1/167* (2013.01); *G05D 2201/0213* (2013.01)

(56) References Cited

U.S. PATENT DOCUMENTS

| | | |
|---|---|---|
| 2008/0291276 A1 | 11/2008 | Randler |
| 2010/0098290 A1 | 4/2010 | Zhang et al. |
| 2011/0060478 A1 | 3/2011 | Nickolaou |
| 2012/0212612 A1 | 8/2012 | Imai et al. |
| 2013/0211720 A1* | 8/2013 | Niemz ............... B62D 15/025 701/538 |
| 2014/0081573 A1 | 3/2014 | Urmson et al. |
| 2014/0176350 A1 | 6/2014 | Niehsen et al. |
| 2015/0009218 A1 | 1/2015 | Fukutomi et al. |
| 2015/0169966 A1 | 6/2015 | Ishimaru et al. |
| 2015/0178588 A1 | 6/2015 | Fischer |
| 2017/0039856 A1* | 2/2017 | Park ....................... G08G 1/166 |

FOREIGN PATENT DOCUMENTS

| | | |
|---|---|---|
| CN | 105358396 A | 2/2016 |
| JP | 4654796 B2 | 3/2011 |
| WO | 2015009218 A1 | 1/2015 |

OTHER PUBLICATIONS

Scania CV AB, Korean Application No. 10-2018-7031957, Office Action, dated Oct. 1, 2019.
Scania CV AB, European Application No. 17786249.7, Extended European Search Report, dated Nov. 4, 2019.
International Search Report for PCT/SE2017/050379 dated Jun. 14, 2017.
Written Opinion of the International Searching Authority for PCT/SE2017/050379 dated Jun. 14, 2017.
Broggi, Alberto et al.; An Evolutionary Approach to Visual Sensing for Vehide Navigation. IEEE Transactions on Industrial Elekctronics. Feb. 2003, vol. 50, Nr 1, p. 18-29, ISSN 0278-0046; p. 18, col. 1, line 33—col. 2, line 10; figure 10.
Swedish Office Action for SE International PatentApplication No. 1650521-6 dated Nov. 29, 2016.
Scania CV AB, Chinese Application No. 201780023270.6, First Office Action, dated Nov. 24, 2020.

* cited by examiner

METHOD AND CONTROL UNIT IN A VEHICLE FOR ESTIMATING A STRETCH OF A ROAD BASED ON A SET OF TRACKS OF ANOTHER VEHICLE

CROSS-REFERENCE TO RELATED APPLICATION(S)

This application is a national stage application (filed under 35 § U.S.C. 371) of PCT/SE2017/050379, filed Apr. 13, 2017 of the same title, which, in turn claims priority to Swedish Application No. 1650521-6, filed Apr. 19, 2016 of the same title; the contents of each of which are hereby incorporated by reference.

FIELD OF THE INVENTION

This document discloses a method and a control unit for estimating a stretch of a road, based on a set of tire tracks of another vehicle when driving a vehicle along the road.

BACKGROUND OF THE INVENTION

Recently developed vehicles may follow a road or traffic lane by detecting road markings and using them for positioning the vehicle on the road laterally, when the vehicle is an autonomous vehicle or a manned vehicle driving in auto pilot mode.

The vehicle may comprise a means for transportation navigating on a road such as e.g. a truck, a car, a motorcycle, a trailer, a bus, a bike, a terrain vehicle, a tractor or other similar manned or unmanned means of conveyance.

In case the vehicle has a driver, a Lane Departure Warning (LDW) system may alert the driver when a road marking line is crossed.

Such warning system typically comprises a camera detecting road markings on the road and by image recognition, a distance to the road markings may be calculated. When the distance is approaching zero, possibly in addition to a safety margin, an alert may be outputted to alert the driver.

However, road marking lines are often worn out due to heavy traffic and insufficient road maintenance. Further, road markings are often covered by snow and ice (winter), leaves (autumn), water, sand, dirt (rest of the year), making it hard or even impossible to discover any road markings at all. Sometimes no road markings have been painted at all, or only an insufficient amount of them.

Document US20080291276 illustrates a method for determining the stretch of the road by detecting road side barriers and combining this information with detecting wheel tracks of other vehicles.

However, all roads do not have road side barriers, at least not on all the route. Nothing is stated in the document how to navigate then. Neither is it discussed how an autonomous vehicle may navigate.

Documents US20140081573, US20110060478 and US20100098290 demonstrate methods for detecting tire tracks with sensors/cameras and thereby determine the road condition. However, nothing is stated concerning using detected tire tracks for any other purposes. Neither is it discussed how an autonomous vehicle may navigate.

Document JP4654796 describes a method for keeping a vehicle within a traffic lane by detecting tire tracks of other vehicles on the road. However, nothing is stated concerning how to distinct tire tracks to follow from tire tracks not to follow, e.g. a vehicle that has driven of the road, has made a U-turn, etc. Neither is it discussed how an autonomous vehicle may navigate.

It appears that further development is required for providing a navigation system for a vehicle, which will follow a road to a destination, in particular for an autonomous vehicle.

SUMMARY OF THE INVENTION

It is therefore an object of this invention to solve at least some of the above problems and provide improved road detection of a vehicle.

According to a first aspect of the invention, this objective is achieved by a method in a vehicle for estimating a stretch of a road, based on a set of tracks of another vehicle, when driving the vehicle along the road in a driving direction to a destination. The method comprises detecting a set of tracks of the other vehicle, on the road. Further, the method also comprises estimating the geographical position of the detected set of tracks. The method further comprises comparing the estimated geographical position of the detected set of tracks with map data. Additionally, the method furthermore comprises rejecting the detected set of tracks when it exits the road to the destination or when situated in a driving lane in a direction opposite to the driving direction; and otherwise estimating the stretch of the road based on the detected set of tracks of the other vehicle.

According to a second aspect of the invention, this objective is achieved by a control unit in a vehicle for estimating a stretch of a road, based on a set of tracks of another vehicle when driving the vehicle along the road in a driving direction to a destination. The control unit is configured to detect the set of tracks of another vehicle on the road via a sensor. Further, the control unit is configured to estimate the geographical position of the detected set of tracks. Also, the control unit is configured to compare the estimated geographical position of the detected set of tracks with map data. The control unit, in further addition, is configured to reject the detected set of tracks when it exits the road to the destination or when situated in a driving lane in a direction opposite to the driving direction; and otherwise estimate the stretch of the road based on the detected set of tracks of the other vehicle.

Thanks to the described aspects, by detecting tracks on the road of other vehicles and using those detected tracks as a guidance for estimating the stretch of the road, it becomes possible to position the vehicle on the road laterally also when there are no road visible marks or road side barriers to use for road stretch estimation. It thereby becomes possible for an autonomous vehicle to navigate also on rough roads (where road markings are worn down), on newly made roads (where road markings have not been applied yet), on roads covered with snow, dust, sand, leaves, etc., and/or in terrain. The disclosed track detecting method may also be used as a support for the driver, in case the vehicle has a driver, e.g. as a system for lane Departure warning. Thereby a robust and confident estimation of the road stretch is achieved, leading to safer driving and improved traffic security, also under tough road conditions with no visible road markings to use for lateral positioning and/or road stretch estimation.

An advantage with the disclosed method is that the more difficult it is to see and recognise the road and the markings upon the road due to snow, dirt, etc., the easier it will be to detect tracks of other vehicles there upon, i.e. on the snow, dirt, etc.

Other advantages and additional novel features will become apparent from the subsequent detailed description.

BRIEF DESCRIPTION OF THE DRAWINGS

Embodiments of the invention will now be described in further detail with reference to the accompanying figures, in which.

DETAILED DESCRIPTION OF THE INVENTION

Embodiments of the invention described herein are defined as a control unit and a method in a control unit, which may be put into practice in the embodiments described below. These embodiments may, however, be exemplified and realized in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1A:
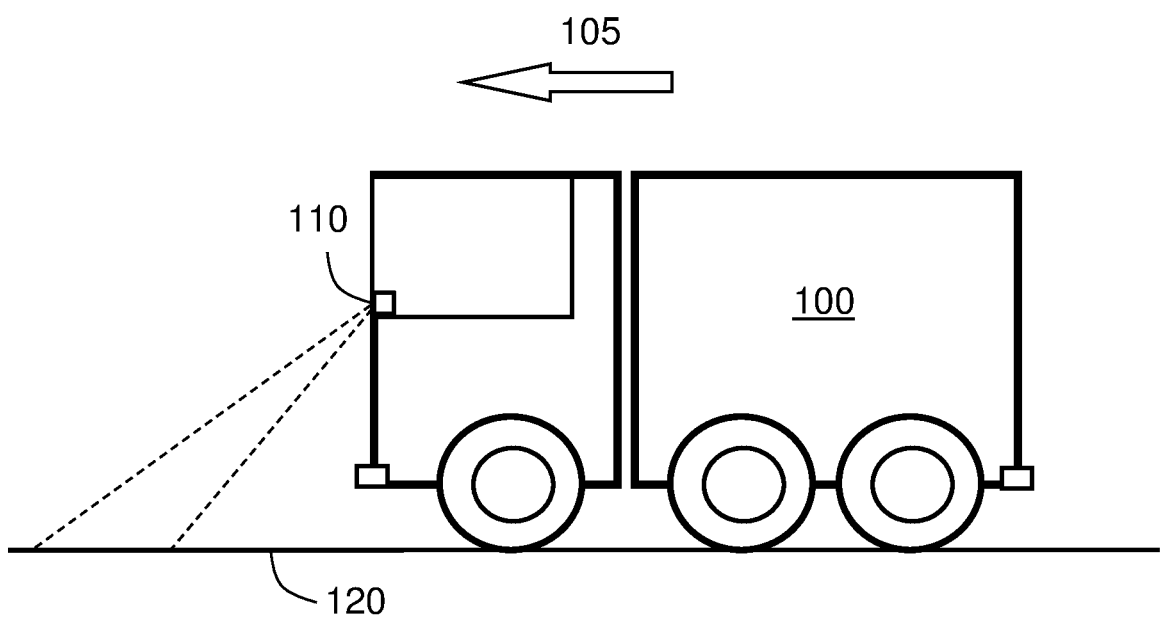
FIG. 1A illustrates a side view of a vehicle according to an embodiment.

FIG. 1A illustrates a vehicle 100, driving in a driving direction 105. The vehicle 100 may, or may not be part of a group of coordinated vehicles, coordinated and organized in a platoon.

Often, when driving on a road 120, road markings such as driving lane lines and road limitations painted on the road 120 cannot be detected due to snow, ice, sleet, dirt, dust, leaves, road wear, etc., making it difficult to estimate a stretch of the road 120. Sometimes no road markings have been painted, or the paint cannot be detected due to insufficient maintenance.

The vehicle 100 comprises a sensor 110 for detecting tracks or signs on the road 120, from another vehicle that previously has driven there, e.g. made by the tires of that vehicle (or a plurality of vehicles) in mud, snow, dirt, humidity, etc. on the road 120. The tracks may also result from road abrasion (ruts in the road 120), tire prints on the road 120 and/or braking marks. These detected tracks are then utilized by the vehicle 100 as a guidance for estimating the ahead stretch of the road 120 and thereby placing the vehicle 100 laterally on the road 120.

When driving off-road, e.g. on a construction site, a mine or on a deforestation site, the detected tracks in the mud, snow, etc., may be utilized for estimating how to navigate in the terrain, also when no proper road exists.

The vehicle 100 may comprise a means for transportation in broad sense such as e.g. a truck, a car, a motorcycle, a trailer, a bus, a bike, a tractor, a snowmobile, a terrain vehicle or other similar manned or unmanned means of conveyance adapted for ground transportation, e.g. on the road 120 or in terrain.

The vehicle 100 may be driver controlled or driverless (i.e. autonomously controlled) in different embodiments. However, for enhanced clarity, the vehicle 100 is subsequently described as having a driver.

The driving direction 105 of the vehicle 100 may be determined based on the location of the destination of the journey, or by extrapolating the driving direction based on previously determined geographical positions and possibly knowledge of the road direction, e.g. from stored map data.

Figure 1B:
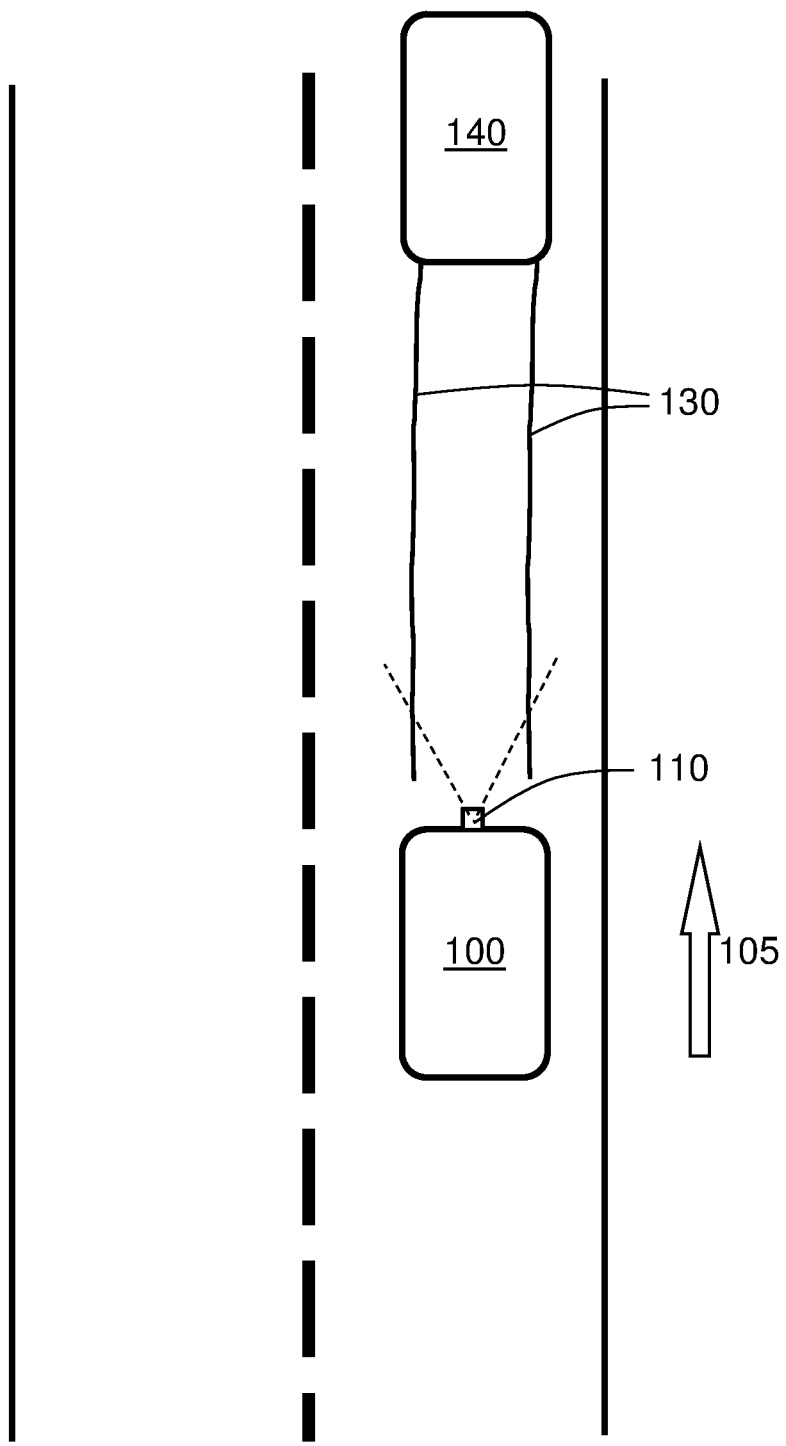
FIG. 1B illustrates a scenario with a vehicle following the tracks of another vehicle in front, according to an embodiment, seen from above.

FIG. 1B illustrates the vehicle 100, driving in the driving direction 105, following a set of tracks 130 of another vehicle 140 by the sensor 110 in the vehicle 100.

The sensor 110 may be a forwardly directed sensor 110 in some embodiments. In the illustrated embodiment, which is merely an arbitrary example, the forwardly directed sensor 110 may be situated e.g. at the front of the vehicle 100, behind the windscreen of the vehicle 100.

Mounting the forwardly directed sensor 110 behind the windshield have some advantages compared to externally mounted camera systems. These advantages include the possibility to use windshield wipers for cleaning and using the light from headlights to illuminate objects in the camera's field of view. It is also protected from dirt, snow, rain and to some extent also from damage, vandalism and/or theft. Such sensor 110 may also be used for a variety of other tasks.

The sensor 110 may be directed towards the front of the vehicle 100, in the driving direction 105. The sensor 110 may comprise e.g. a camera, a stereo camera, an infrared camera, a video camera, a radar, a lidar, an ultrasound device, a time-of-flight camera, or similar device, in different embodiments.

In some embodiments, the sensors 110 may comprise e.g. a motion detector and/or be based on a Passive Infrared (PIR) sensor sensitive to a person's skin temperature through emitted black body radiation at mid-infrared wavelengths, in contrast to background objects at room temperature; or by emitting a continuous wave of microwave radiation and detect motion through the principle of Doppler radar; or by emitting an ultrasonic wave an detecting and analysing the reflections; or by a tomographic motion detection system based on detection of radio wave disturbances, to mention some possible implementations.

The sensor 110 may comprise a set of sensors of different types in some embodiments, such as e.g. some of the above enumerated types.

The sensor 110 may be configured for various purposes in different embodiments, such as capturing images of a vehicle or other object in front. However, the sensor 110 may be in particular configured for capturing images of tracks 130 on the road 120. The sensor 110, or one of the sensors 110 as may be the case, may in some embodiments be based on laser, radar, etc., and may be configured to measure a distance to a segment of the road 120. Thereby, tracks 130 in the road 120 comprising road abrasion may be detected.

In some embodiments, the sensor 110 may be configured to detect road marks such as lane delimiting lines etc., which detected marks may be used for estimating the stretch of the road 120. However, when the road marks cannot be detected due to snow, dust, sand, etc., tracks 130 of other vehicles on the road 120 may be detected and utilized for estimating the stretch of the road 120.

The tracks 130 on the road 120 may be detected by the sensor 110 by image recognition/computer vision and object recognition in some embodiments.

Computer vision is a technical field comprising methods for acquiring, processing, analysing, and understanding images and, in general, high-dimensional data from the real world in order to produce numerical or symbolic information. A theme in the development of this field has been to duplicate the abilities of human vision by electronically perceiving and understanding an image. Understanding in this context means the transformation of visual images (the input of retina) into descriptions of world that can interface with other thought processes and elicit appropriate action. This image understanding can be seen as the disentangling of symbolic information from image data using models constructed with the aid of geometry, physics, statistics, and learning theory. Computer vision may also be described as the enterprise of automating and integrating a wide range of processes and representations for vision perception.

The image data of the sensor 110 may take many forms, such as e.g. images, video sequences, views from multiple cameras, or multi-dimensional data from a scanner.

Computer vision may comprise e.g. scene reconstruction, event detection, video tracking, object recognition, object pose estimation, learning, indexing, motion estimation, and image restoration, just to mention some arbitrary examples.

The detected tracks 130 on the road 120 may thus be utilized for estimating the stretch of the road 120 ahead of the vehicle 100, e.g. for positioning the vehicle 100 laterally on the road 120; either for navigating with an autonomous vehicle or as an autopilot functionality or driver support in a vehicle having a driver. However, a filtering has to be made of tracks from vehicles driving in a driving lane in a direction opposite to the driving direction 105 and tracks 130 of vehicles exiting the road 120 or making a U-turn etc.

Further, in some embodiments, the detected tracks 130 may be used for determining how to place the own vehicle 100 laterally on the road 120, in order to avoid aquaplaning (in case of humid road conditions) and/or avoid to get stuck when driving in muddy conditions.

Furthermore, by comparing the detected track shape and interrelationships with map data, the tracks 130 may also be used to position the vehicle 100, in some embodiments.

An advantage with the disclosed method is that the more difficult it is to see the road 120 and the markings upon the road 120 (due to snow, dirt, etc.), the easier it will be to detect tracks 130 of other vehicles 140 there upon, i.e. on the snow, dirt, etc.

Figure 2A:
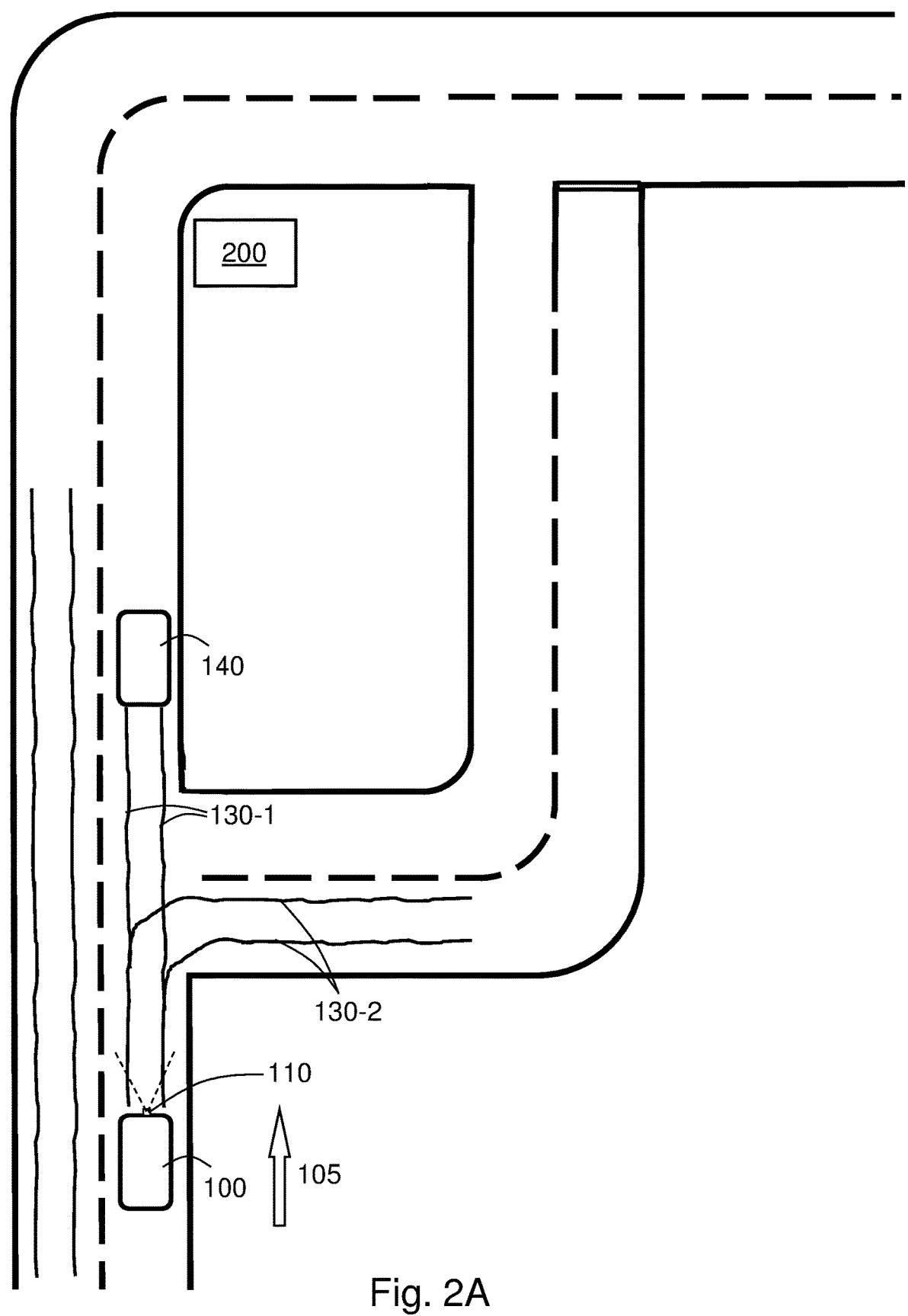
FIG. 2A illustrates a scenario with a vehicle following the tracks of another vehicle in front, according to an embodiment, seen from above.

FIG. 2A illustrates a scenario wherein the vehicle 100, driving in the driving direction 105, following a set of tracks 130 of another vehicle 140 by the sensor 110 in the vehicle 100 when driving to a destination 200.

The destination 200 of the vehicle 100 may be extracted from a navigator of the vehicle 100, or may be entered by the driver of the vehicle 100, if any.

In the illustrated example, a first set of tracks 130-1 are directed in the driving direction 105 of the vehicle 100 towards the destination 200, while a second set of tracks 130-2 exits the road 120 and are not directed towards the destination 200.

By knowing the driving direction 105 of the vehicle 100 and the destination 200 of the vehicle 100, such tracks 130-2 not directed towards the destination 200 may be neglected, filtered out and disregarded.

Furthermore, by comparing the detected track shape and interrelationships with map data, the tracks 130 may also be used to position the vehicle 100, in some embodiments, e.g. when the vehicle 100 lacks a positioning device, or in situations when positioning based on satellites cannot be made, such as in mines, inside structures, in tunnels, etc. By comparing track shapes with map data and by determining the driving direction 105 the position of the vehicle 100 may be determined.

Figure 2B:
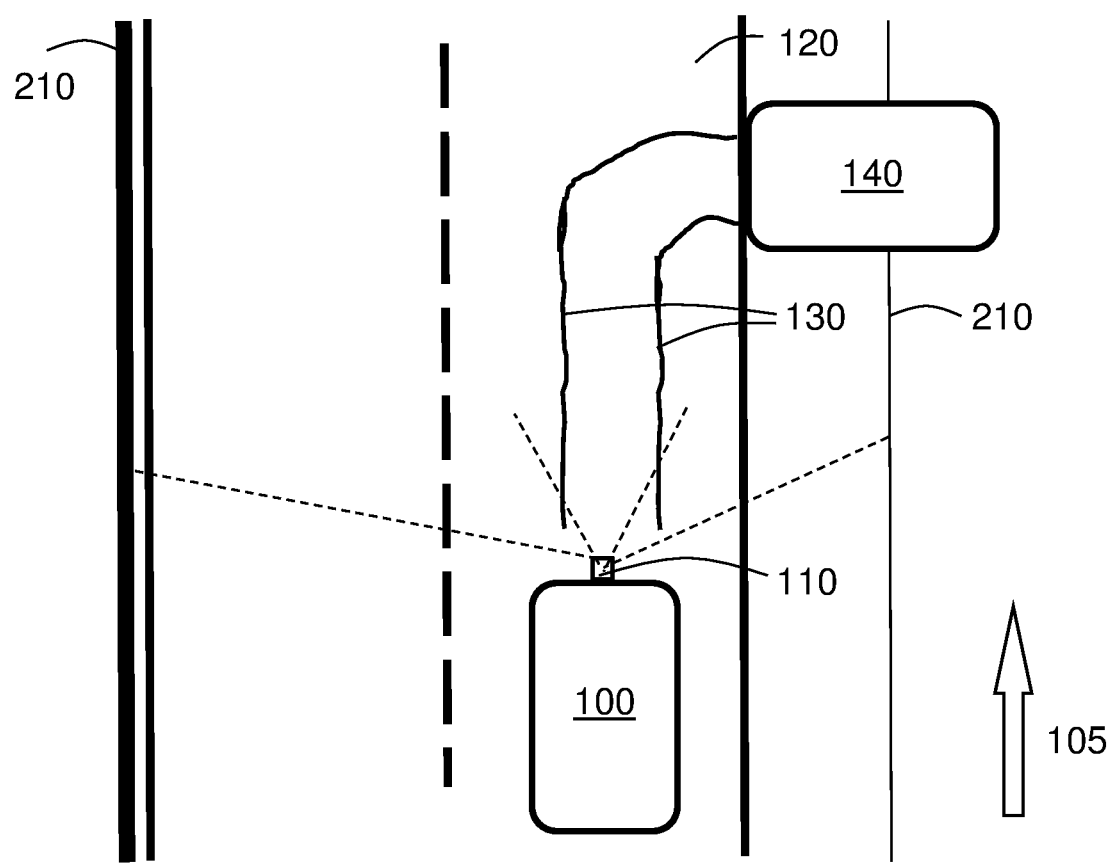
FIG. 2B illustrates a scenario with a vehicle neglecting the tracks of another vehicle in front, according to an embodiment, seen from above.

FIG. 2B illustrates a scenario wherein the vehicle 100, driving in the driving direction 105, following a set of tracks 130 of another vehicle 140 by the sensor 110 in the vehicle 100 when driving to a destination 200 on the road 120.

In the illustrated embodiment, a road side object 210 is detected along the road 120. The road side object 210 may be e.g., ditches, a road side barrier, a road limitation, a noise barrier, a wildlife fence, road lights, embankments, a fence, a pavement, a bicycle road, a wall, a construction, a house, an allée, a line of trees or any other similar structure or element.

The detected set of tracks 130, and the direction of the tracks 130 may in some embodiments be compared with the detected road side object 210 along the road 120. In case the set of detected tracks 130 is directed to/from the detected road side object 210, that set of tracks 130 may be neglected, as it most likely comes from a vehicle 140 having exited the road 120, on purpose or by an accident, etc.

Thereby inappropriate sets of tracks 130 may be detected and disregarded, while instead tracks following the road 120 in the driving direction 105 towards the destination 200, in some embodiments.

Figure 2C:
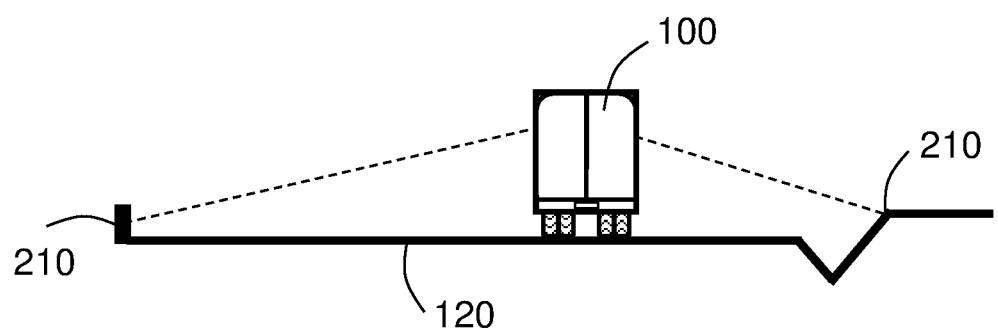
FIG. 2C illustrates a scenario with a vehicle following the tracks of another vehicle in front, according to an embodiment, seen from behind.

FIG. 2C illustrates the scenario of FIG. 2B as it may be regarded from behind.

The road side object 210 is here illustrated as a ditch and a road side barrier on the right/left sides, respectively. However, as already mentioned, the road side object 210 may comprise also other objects.

Figure 3:
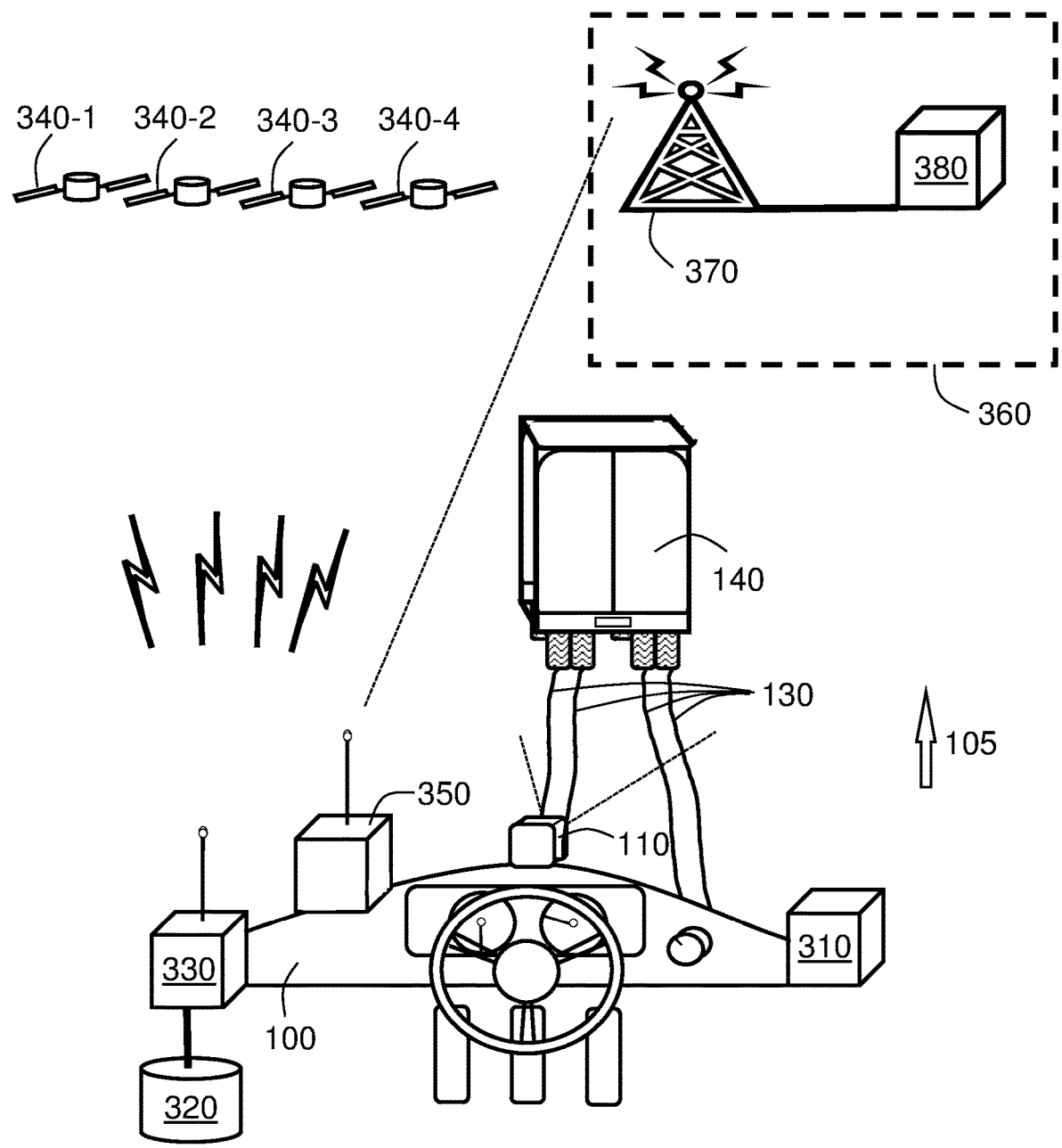
FIG. 3 schematically illustrates a vehicle interior of a vehicle following the tracks of another vehicle according to an embodiment.

FIG. 3 illustrates an example of a scenario as illustrated in any of FIGS. 1A-1B and/or FIGS. 2A-2C, as it may be perceived by the driver of the vehicle 100 (if any), detecting and following a set of tracks 130 of another vehicle 140.

The vehicle 100 comprises a control unit 310. The control unit 310 is arranged in the vehicle 100 for estimating a stretch of the road 120, based on a set of tracks 130 of the other vehicle 140 and performing various calculations, computations and control tasks associated therewith.

The geographical position of the vehicle 100 may be determined by a positioning device 330, or navigator, in the vehicle 100, which may be based on a satellite navigation system such as the Navigation Signal Timing and Ranging (Naystar) Global Positioning System (GPS), Differential GPS (DGPS), Galileo, GLONASS, or the like.

The positioning device 330 may be connected to a database 320 comprising map data. Such database 320 may be situated in the vehicle 100, or possibly external to the vehicle 100 in some embodiments.

The geographical position of the positioning device 330, (and thereby also of the vehicle 100) may be made continuously with a certain predetermined or configurable time intervals according to various embodiments.

Positioning by satellite navigation is based on distance measurement using triangulation from a number of satellites 340-1, 340-2, 340-3, 340-4. In this example, four satellites 340-1, 340-2, 340-3, 340-4 are depicted, but this is merely an example. More than four satellites 340-1, 340-2, 340-3, 340-4 may be used for enhancing the precision, or for creating redundancy. The satellites 340-1, 340-2, 340-3, 340-4 continuously transmit information about time and date (for example, in coded form), identity (which satellite 340-1, 340-2, 340-3, 340-4 that broadcasts), status, and where the satellite 340-1, 340-2, 340-3, 340-4 are situated at any given time. The GPS satellites 340-1, 340-2, 340-3, 340-4 sends information encoded with different codes, for example, but not necessarily based on Code Division Multiple Access (CDMA). This allows information from an individual satellite 340-1, 340-2, 340-3, 340-4 distinguished from the others' information, based on a unique code for each respective satellite 340-1, 340-2, 340-3, 340-4. This information can then be transmitted to be received by the appropriately adapted positioning device comprised in the vehicle 100.

Distance measurement can according to some embodiments comprise measuring the difference in the time it takes for each respective satellite signal transmitted by the respective satellites 340-1, 340-2, 340-3, 340-4 to reach the positioning device 330. As the radio signals travel at the speed of light, the distance to the respective satellite 340-1, 340-2, 340-3, 340-4 may be computed by measuring the signal propagation time.

The positions of the satellites 340-1, 340-2, 340-3, 340-4 are known, as they continuously are monitored by approximately 15-30 ground stations located mainly along and near the earth's equator. Thereby the geographical position, i.e. latitude and longitude, of the vehicle 100 may be calculated by determining the distance to at least three satellites 340-1, 340-2, 340-3, 340-4 through triangulation. For determination of altitude, signals from four satellites 340-1, 340-2, 340-3, 340-4 may be used according to some embodiments.

The geographical position of the positioning device 330, (and thereby also of the vehicle 100), as well as time, vehicle speed, heading, etc., may be determined continuously, or at a certain predetermined or configurable time interval according to various embodiments.

The geographical position of the vehicle 100 may alternatively be determined, e.g. by having transponders positioned at known positions around the route and a dedicated sensor in the vehicle 100, for recognizing the transponders and thereby determining the position; by detecting and recognizing WiFi networks (WiFi networks along the route may be mapped with certain respective geographical positions in a database); by receiving a Bluetooth beaconing signal, associated with a geographical position, or other signal signatures of wireless signals such as e.g. by triangulation of signals emitted by a plurality of fixed base stations with known geographical positions. The position may alternatively be entered by the driver of the vehicle 100, if any.

Having determined the geographical position of the vehicle 100 by the positioning device 330 (or in another way), it may be presented on a map, a screen or a display device where the position of the vehicle 100 may be marked in some optional, alternative embodiments.

The vehicles 100 may communicate with a vehicle external structure 360 over a wireless interface via an optional transceiver 350. The vehicle external structure 360 may comprise a transceiver 370 and a computational device 380.

The computational device 380 may comprise, or be connected to a database for keeping traffic information concerning various traffic accidents, traffic incidents, road work, obstructions on the road 120, etc., and information concerning geographical position of such anomaly.

According to some embodiments, the computational device 380 may transmit information, i.e. warnings concerning various traffic anomalies on the road 120 to vehicles 100 in or around the geographical position of the particular traffic accident. Thereby the vehicle 100 is informed about the anomaly, which may be e.g. a vehicle has driven off the road 120, etc., and measures may be taken for avoiding to follow tracks of such vehicle at the geographical position.

Communication may be made over a wireless communication interface, such as e.g. Vehicle-to-Vehicle (V2V) communication, or Vehicle-to-Structure (V2X) communication.

In some embodiments, the communication between vehicles 100, 300 may be performed via V2V communication, e.g. based on Dedicated Short-Range Communications (DSRC) devices. DSRC works in 5.9 GHz band with bandwidth of 75 MHz and approximate range of 1000 m in some embodiments.

The wireless communication may be made according to any IEEE standard for wireless vehicular communication like e.g. a special mode of operation of IEEE 802.11 for vehicular networks called Wireless Access in Vehicular Environments (WAVE). IEEE 802.11p is an extension to 802.11 Wireless LAN medium access layer (MAC) and physical layer (PHY) specification.

Such wireless communication interface may comprise, or at least be inspired by wireless communication technology such as Wi-Fi, Wireless Local Area Network (WLAN), Ultra Mobile Broadband (UMB), Bluetooth (BT), Near Field Communication (NFC), Radio-Frequency Identification (RFID), Z-wave, ZigBee, IPv6 over Low power Wireless Personal Area Networks (6LoWPAN), Wireless Highway Addressable Remote Transducer (HART) Protocol, Wireless Universal Serial Bus (USB), optical communication such as Infrared Data Association (IrDA) or infrared transmission to name but a few possible examples of wireless communications in some embodiments.

The communication may alternatively be made over a wireless interface comprising, or at least being inspired by radio access technologies such as e.g. 3GPP LTE, LTE-Advanced, E-UTRAN, UMTS, GSM, GSM/EDGE, WCDMA, Time Division Multiple Access (TDMA) networks, Frequency Division Multiple Access (FDMA) networks, Orthogonal FDMA (OFDMA) networks, Single-Carrier FDMA (SC-FDMA) networks, World-wide Interoperability for Microwave Access (WiMax), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies, e.g., CDMA2000 1×RTT and High Rate Packet Data (HRPD), or similar, just to mention some few options, via a wireless communication network.

Communication between the various units 110, 310, 330, 340, 350 in the vehicle 100 may interactively communicate between themselves via e.g. a wired or wireless communication bus. The communication bus may comprise e.g. a Controller Area Network (CAN) bus, a Media Oriented Systems Transport (MOST) bus, or similar. However, the communication may alternatively be made over a wireless connection comprising, or at least be inspired by any of the previously discussed wireless communication technologies.

Figure 4:
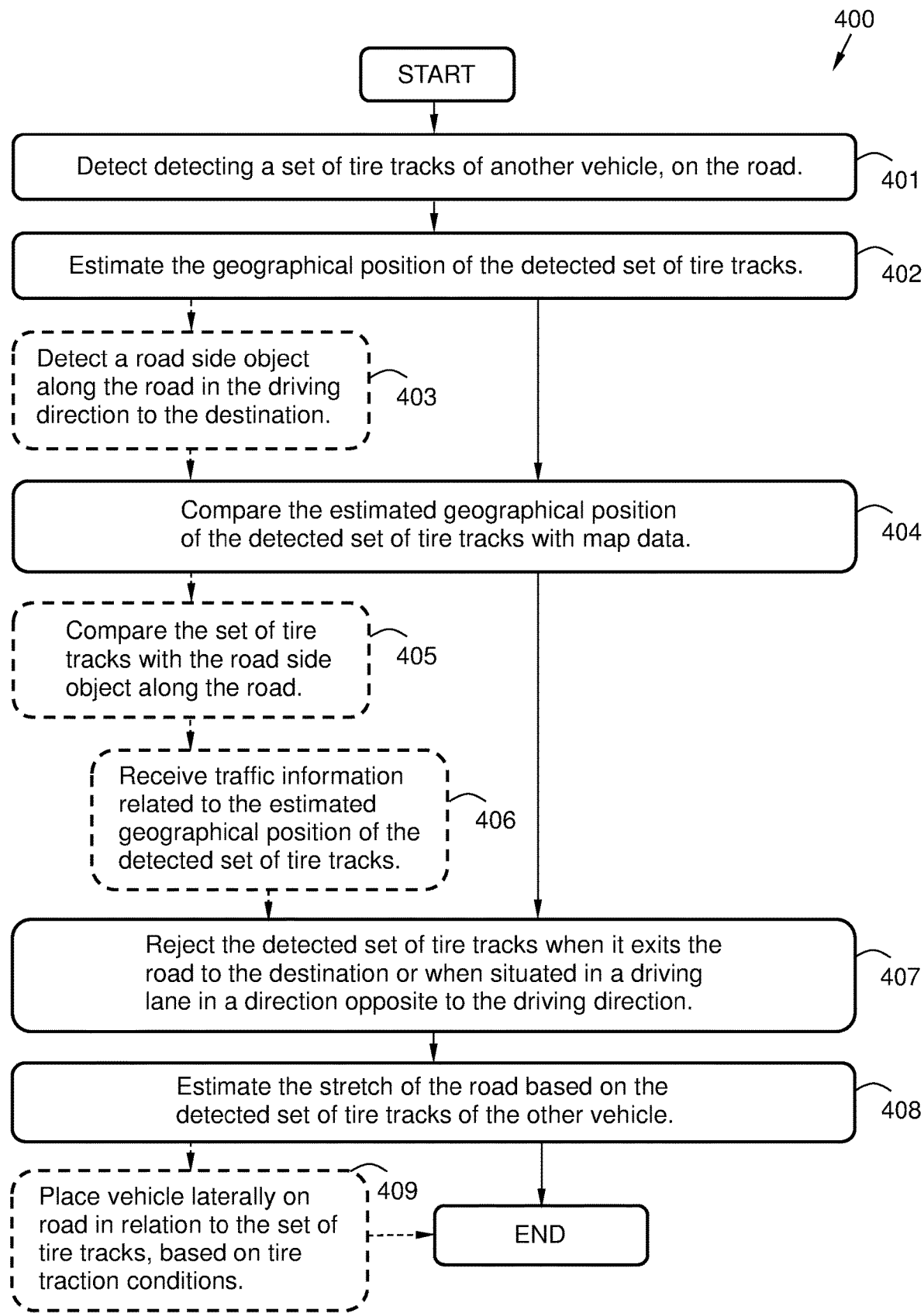
FIG. 4 is a flow chart illustrating an embodiment of the method.

FIG. 4 illustrates an example of a method 400 according to an embodiment. The flow chart in FIG. 4 shows the method 400 in a vehicle 100. The method 400 aims at estimating a stretch of a road 120, based on a set of tracks 130 of another vehicle 140, when driving the vehicle 100 along the road 120 in a driving direction 105 to a destination 200. It may thereby be possible to position the vehicle laterally on the road 120, based on detected set of tracks 130.

The road 120, as the concept is utilized herein, may be an asphalt road, a gravel road, a path, a trail, a passage, etc.

In order to be able to facilitate road stretch estimation, the method 400 may comprise a number of steps 401-409. However, some of these steps 401-409 may be performed solely in some alternative embodiments, like e.g. steps 403, 405-407 and 409. Further, the described steps 401-409 may be performed in a somewhat different chronological order than the numbering suggests. The method 400 may comprise the subsequent steps:

Step 401 comprises detecting a set of tracks 130 of the other vehicle 140, on the road 120.

The set of tracks 130 may be detected by at least one on-board sensor 110 in the vehicle 100.

The tracks 130 may comprise tire marks in snow, sand, dust, humid/wet asphalt, leaves, mud, etc. The tracks 130 may also comprise abrasions on the road 120, or alternatively rubber marks or tire prints on the asphalt in different embodiments.

Step 402 comprises estimating the geographical position of the detected 401 set of tracks 130.

The geographical position of the vehicle 100 may be determined by a positioning device 330 in some embodiments.

Such estimation of geographical position may be made continuously or at some configurable or predetermined time interval of any arbitrary length, from e.g. some seconds, to several hours or even days, in some embodiments.

Step 403, which only may be comprised in some embodiments, comprises detecting a road side object 210 along the road 120 in the driving direction 105 to the destination 200.

The road side object 210 may be e.g., ditches, a road side barrier, a road limitation, a noise barrier, a wildlife fence, road lights, embankments, a fence, a pavement, a bicycle road, a wall, a construction, a house, an allée, a line of trees or any other similar structure or element being clearly situated external to the road 120.

Step 404 comprises comparing the estimated 402 geographical position of the detected 401 set of tracks 130 with map data.

By the made comparison, it may be determined that the tracks 130 are situated on the road 120, in the driving direction 105 of the vehicle 100 towards the destination 200.

Step 405, which only may be comprised in some embodiments wherein step 403 has been performed, comprises comparing the detected 401 set of tracks 130 with the detected 403 road side object 210 along the road 120.

By the made comparison, it may be determined that the tracks 130 are leading off the road 120, and thereby are inappropriate for the vehicle 100 to follow when driving towards the destination 200.

Step 406, which only may be comprised in some embodiments, comprises receiving traffic information related to the estimated 402 geographical position of the detected 401 set of tracks 130.

Such traffic information may comprise geographical position of a car crash, a vehicle that has driven off the road 120, etc.

Step 407 comprises rejecting the detected 401 set of tracks 130 when it exits the road 120 to the destination 200 or when situated in a driving lane in a direction opposite to the driving direction 105.

The rejection of the detected 401 set of tracks 130 may be made when the detected 401 set of tracks 130 is directed towards the detected 403 road side object 210, in some embodiments.

Alternatively, in some embodiments, the rejection of the detected 401 set of tracks 130 may be made when traffic information is received 406 concerning the detected 401 set of tracks 130.

It is thereby avoided that the vehicle 100 is following tracks 130 of vehicles that has driven off the road 120, vehicles that have been involved in a collision, etc.

Step 408 comprises estimating the stretch of the road 120 based on the detected 401 set of tracks 130 of the other vehicle 140.

Step 409, which only may be comprised in some embodiments, comprises placing the vehicle 100 laterally on the road 120 in relation to the detected 401 set of tracks 130, based on tire traction conditions of the vehicle 100.

Thereby, aquaplaning may be avoided, by driving with the wheels of the own vehicle 100 in the trails 130 of an in-front vehicle 140 which has pushed aside water on the road 120, in some embodiments.

In case the trails 130 comprises ruts in the road 120, which becomes filled with water during rainy conditions, aquaplaning may be avoided, by not driving with the wheels of the own vehicle 100 in the trails 130, but instead driving in parallel with the ruts, i.e. the detected trails 130.

When driving on a slippery surface, such as off-road in clay etc., it may be avoided that the vehicle 100 gets stuck in the mud by not driving with the wheels of the own vehicle 100 in the trails 130, but instead driving in parallel with them.

Figure 5:
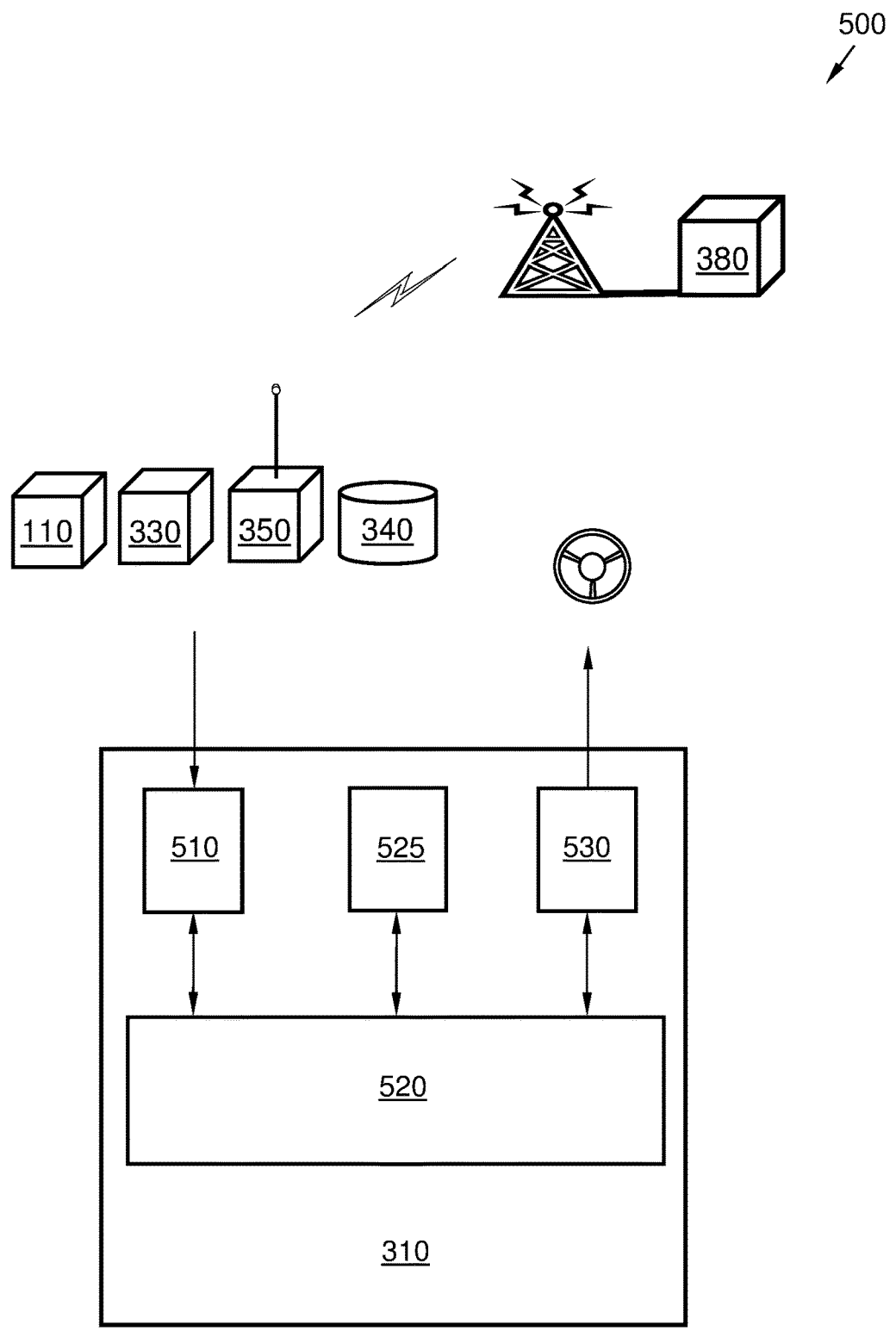
FIG. 5 is an illustration depicting a system according to an embodiment.

FIG. 5 presents a system 500. The system 500 aims at estimating a stretch of a road 120, based on a set of tracks 130 of another vehicle 140 when driving a vehicle 100 along the road 120 in a driving direction 105 to a destination 200.

The system 500 comprises a sensor 110, arranged on the vehicle 100 for detecting tracks on the road 120. Further, the system 500 also comprises a positioning device 330 for estimating the geographical position of the vehicle 100. In addition, the system 500 also comprises a database 320 comprising map data.

Furthermore, the system 500 also comprises a control unit 310 for performing the method 400 according to any, some or all of the previously described steps 401-409 as described above and illustrated in FIG. 4. Thus the control unit 310 aims at estimating a stretch of a road 120, based on a set of tracks 130 of another vehicle 140 when driving the vehicle 100 along the road 120 in a driving direction 105 to a destination 200.

The control unit 310 is configured to detect the set of tracks 130 of another vehicle 140 on the road 120 via a sensor 110. Further, the control unit 310 is configured to estimate the geographical position of the detected set of tracks 130. In addition, the control unit 310 is also configured to compare the estimated geographical position of the detected set of tracks 130 with map data. Also, the control unit 310 is configured to reject the detected set of tracks 130 when it exits the road 120 to the destination 200 or when situated in a driving lane in a direction opposite to the driving direction 105. The control unit 310 is configured to otherwise, in case the detected set of tracks 130 is not rejected, estimate the stretch of the road 120 based on the detected set of tracks 130 of the other vehicle 140.

According to some embodiments, control unit 310 may be further configured to detect a road side object 210 along the road 120 in the driving direction 105 to the destination 200.

Also, the control unit 310 may be further configured to compare the detected set of tracks 130 with the detected road side object 210 along the road 120. Furthermore, the control unit 310 may be configured to reject the detected set of tracks 130 when the detected set of tracks 130 is directed towards the detected road side object 210.

In further addition, according to some embodiments, the control unit 310 may also be configured to receive traffic information related to the estimated geographical position of the detected set of tracks 130. Further, the control unit 310 may be configured to reject the detected set of tracks 130 when traffic information is received concerning the detected set of tracks 130.

In some embodiments, the control unit 310 may also be configured to place the vehicle 100 laterally on the road 120 in relation to the detected set of tracks 130, based on tire traction conditions of the vehicle 100.

Furthermore, in some alternative embodiments, the geographical position of the detected set of tracks 130 may be estimated by determining the geographical position of the vehicle 100 via a positioning unit 330 and determining the position of the detected set of tracks 130 in relation to the vehicle 100.

The control unit 310 may comprise a receiving unit 510 configured for receiving information via a communication device 350 for wireless communication, with a database 340, with a positioning device 330 and with one or more sensors 110.

The control unit 310 may further comprise a processor 520 configured for performing various calculations for conducting the method 400 according to at least some of the previously described method steps 401-409 for estimating a stretch of a road 120, based on a set of tracks 130 of another vehicle 140, when driving the vehicle 100 along the road 120 in a driving direction 105 to a destination 200.

Such processor 520 may comprise one or more instances of a processing circuit, i.e. a Central Processing Unit (CPU), a processing unit, an Application Specific Integrated Circuit (ASIC), a microprocessor, or other processing logic that may interpret and execute instructions. The herein utilized expression "processor" may thus represent a processing circuitry comprising a plurality of processing circuits, such as, e.g., any, some or all of the ones enumerated above.

Furthermore, the control unit 310 may comprise a memory 525 in some embodiments. The optional memory 525 may comprise a physical device utilized to store data or programs, i.e., sequences of instructions, on a temporary or permanent basis. According to some embodiments, the memory 525 may comprise integrated circuits comprising silicon-based transistors. The memory 525 may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

Further, the control unit 310 may comprise a signal transmitting unit 530. The signal transmitting unit 530 may be configured for transmitting control signals for controlling the navigation of the vehicle 100, or assisting the driver in controlling the vehicle 100 in some embodiments.

The previously described method steps 401-409 to be performed in the control unit 310 may be implemented through the one or more processors 520 within the control unit 310, together with computer program product for performing at least some of the functions of the steps 401-409. Thus a computer program product, comprising instructions for performing the steps 401-409 in the control unit 310 may perform the method 400 comprising at least some of the steps 401-409 for estimating a stretch of a road 120, based on a set of tracks 130 of another vehicle 140, when driving the vehicle 100 along the road 120 in a driving direction 105 to a destination 200, when the computer program is loaded into the one or more processors 520 of the control unit 310.

The described steps 401-409 thus may be performed by a computer algorithm, a machine executable code, a non-transitory computer-readable medium, or a software instructions programmed into a suitable programmable logic such as the one or more processors 520 in the control unit 310 in various embodiments.

The computer program product mentioned above may be provided for instance in the form of a data carrier carrying computer program code for performing at least some of the step 401-409 according to some embodiments when being loaded into the one or more processors 520 of the control unit 310. The data carrier may be, e.g., a hard disk, a CD ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the control unit 310 remotely, e.g., over an Internet or an intranet connection.

Further, some embodiments may comprise a vehicle 100, comprising the control unit 310, as described above, for performing the method according to at least some of the described method steps 401-409.

The terminology used in the description of the embodiments as illustrated in the accompanying drawings is not intended to be limiting of the described method 400, control unit 310; computer program, and/or system 500. Various changes, substitutions and/or alterations may be made, without departing from invention embodiments as defined by the appended claims.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

The invention claimed is:

1. A method for operation in a vehicle for estimating a stretch of a road based on a set of tracks of another vehicle, when driving the vehicle along a road in a driving direction to a destination, said method comprising:

detecting a set of tracks of the other vehicle on the road;

estimating a geographical position of the detected set of tracks;

comparing the estimated geographical position of the detected set of tracks with map data;

rejecting the detected set of tracks when it exits the road or when situated in a driving lane in a direction opposite to the driving direction; and otherwise, if the set of tracks are not rejected, estimating the stretch of the road based on the detected set of tracks of the other vehicle.

2. The method according to claim 1, further comprising:

detecting a road side object along the road in the driving direction to the destination;

comparing the detected set of tracks with the detected road side object along the road; and wherein rejection of the detected set of tracks is made when the detected set of tracks is directed towards the detected road side object.

3. The method according to claim 1 further comprising:

receiving traffic information related to the estimated geographical position of the detected set of tracks; and wherein rejection of the detected set of tracks is made when traffic information is received concerning the detected set of tracks.

4. The method according to claim 1 further comprising:

placing the vehicle laterally on the road in relation to the detected set of tracks, based on tire traction conditions of the vehicle.

5. A control unit in a vehicle for estimating a stretch of a road based on a set of tracks of another vehicle when driving the vehicle along the road in a driving direction to a destination, wherein the control unit is configured to:

detect the set of tracks of another vehicle on the road via a sensor;

estimate a geographical position of the detected set of tracks;

compare the estimated geographical position of the detected set of tracks with map data;

reject the detected set of tracks when it exits the road or when situated in a driving lane in a direction opposite to the driving direction; and otherwise, if the set of tracks are not rejected, estimate the stretch of the road based on the detected set of tracks of the other vehicle.

6. The control unit according to claim 5, further configured to:

detect a road side object along the road in the driving direction to the destination;

compare the detected set of tracks with the detected road side object along the road; and reject the detected set of tracks when the detected set of tracks is directed towards the detected road side object.

7. The control unit according to claim 5, further configured to:

receive traffic information related to the estimated geographical position of the detected set of tracks; and reject the detected set of tracks when traffic information is received concerning the detected set of tracks.

8. The control unit according to claim 5, further configured to:

place the vehicle laterally on the road in relation to the detected set of tracks, based on tire traction conditions of the vehicle.

9. The control unit according to claim 5, wherein the geographical position of the detected set of tracks is estimated by determining the geographical position of the vehicle via a positioning unit and determining the position of the detected set of tracks in relation to the vehicle.

10. A computer program product comprising program code stored on a non-transitory computer-readable medium, said computer program product for estimating a stretch of a road based on a set of tracks of another vehicle, when driving a vehicle along a road in a driving direction to a destination, wherein said computer program code comprises computer instructions to cause said at least one control unit to perform the following operations:

detecting a set of tracks of the other vehicle on the road;

estimating a geographical position of the detected set of tracks;

comparing the estimated geographical position of the detected set of tracks with map data;

rejecting the detected set of tracks when it exits the road or when situated in a driving lane in a direction opposite to the driving direction; and otherwise, if the set of tracks are not rejected, estimating the stretch of the road based on the detected set of tracks of the other vehicle.

11. A system for estimating a stretch of a road, based on a set of tracks of another vehicle when driving a vehicle along the road in a driving direction to a destination, wherein the system comprises:

a sensor arranged on the vehicle;

a positioning device for estimating the geographical position of the vehicle;

a database comprising map data; and a control unit configured to:

detecting a set of tracks of the other vehicle on the road;

estimating a geographical position of the detected set of tracks;

comparing the estimated geographical position of the detected set of tracks with map data;

rejecting the detected set of tracks when it exits the road or when situated in a driving lane in a direction opposite to the driving direction; and otherwise, if the set of tracks are not rejected, estimating the stretch of the road based on the detected set of tracks of the other vehicle.

* * * * *